United States Patent
Markov et al.

(10) Patent No.: US 9,990,721 B2
(45) Date of Patent: ***Jun. 5, 2018

(54) SYSTEM AND METHOD FOR DETECTING TRACHEA

(71) Applicant: COVIDIEN LP, Mansfield, MA (US)

(72) Inventors: Igor A. Markov, Hod Hasharon (IL); Yuri Kreinin, Ontario (CA)

(73) Assignee: COVIDIEN LP, Mansfield, MA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/672,612

(22) Filed: Aug. 9, 2017

(65) Prior Publication Data

US 2017/0365056 A1     Dec. 21, 2017

Related U.S. Application Data

(63) Continuation of application No. 15/383,044, filed on Dec. 19, 2016, now Pat. No. 9,741,115, which is a
(Continued)

(51) Int. Cl.
*G06K 9/00* (2006.01)
*G06T 7/00* (2017.01)
(Continued)

(52) U.S. Cl.
CPC .......... *G06T 7/0012* (2013.01); *G06K 9/4638* (2013.01); *G06T 7/11* (2017.01); *G06T 7/187* (2017.01); *G06T 15/205* (2013.01); *G06K 2209/051* (2013.01); *G06T 2200/04* (2013.01); *G06T 2200/08* (2013.01);
(Continued)

(58) Field of Classification Search
None
See application file for complete search history.

(56) References Cited

U.S. PATENT DOCUMENTS 5,592,939 A   1/1997   Martinelli
5,611,025 A   3/1997   Lorensen et al.
(Continued)

OTHER PUBLICATIONS

European Search Report for Application No. 15814878.3 dated Dec. 6, 2017 (10 pages).
(Continued)

*Primary Examiner* — Shervin Nakhjavan

(57) ABSTRACT

Disclosed are systems, devices, and methods for detecting a trachea, an exemplary system comprising an imaging device configured to obtain image data and a computing device configured to generate a three-dimensional (3D) model, identify a potential connected component in a first slice image, identify a potential connected component in a second slice image, label the first slice image as a top slice image, label the connected component in the top slice image as an active object, associate each connected component in a current slice image with a corresponding connected component in a previous slice image based on a connectivity criterion, label each connected component in the current slice image associated with a connected component of the preceding slice image as the active object, and identify the active object as the trachea, based on a length of the active object.

18 Claims, 6 Drawing Sheets

Related U.S. Application Data continuation of application No. 14/755,708, filed on Jun. 30, 2015, now Pat. No. 9,530,219.

(60) Provisional application No. 62/020,257, filed on Jul. 2, 2014.

(51) Int. Cl.
*G06T 15/20* (2011.01)
*G06T 7/187* (2017.01)
*G06T 7/11* (2017.01)
*G06K 9/46* (2006.01)

(52) U.S. Cl.
CPC .............. *G06T 2207/10081* (2013.01); *G06T 2207/10088* (2013.01); *G06T 2207/10104* (2013.01); *G06T 2207/10121* (2013.01); *G06T 2207/10132* (2013.01); *G06T 2207/30061* (2013.01)

(56) References Cited

U.S. PATENT DOCUMENTS

| | | | |
|---|---|---|---|
| 5,676,673 A | 10/1997 | Ferre et al. | |
| 5,682,886 A * | 11/1997 | Delp | A61B 17/154 128/920 |
| 5,697,377 A | 12/1997 | Wittkampf | |
| 5,699,799 A | 12/1997 | Xu et al. | |
| 5,715,836 A | 2/1998 | Kliegis et al. | |
| 5,729,129 A | 3/1998 | Acker | |
| 5,752,513 A | 5/1998 | Acker et al. | |
| 5,782,762 A | 7/1998 | Vining | |
| 5,881,124 A | 3/1999 | Giger et al. | |
| 5,891,030 A | 4/1999 | Johnson et al. | |
| 5,913,820 A | 6/1999 | Bladen et al. | |
| 5,920,319 A | 7/1999 | Vining et al. | |
| 5,967,980 A | 10/1999 | Ferre et al. | |
| 5,971,767 A | 10/1999 | Kaufman et al. | |
| 5,987,960 A | 11/1999 | Messner et al. | |
| 6,019,725 A | 2/2000 | Vesely et al. | |
| 6,047,080 A | 4/2000 | Chen et al. | |
| 6,083,162 A | 7/2000 | Vining | |
| 6,138,045 A | 10/2000 | Kupinski et al. | |
| 6,151,404 A | 11/2000 | Pieper | |
| 6,167,296 A | 12/2000 | Shahidi | |
| 6,181,348 B1 | 1/2001 | Geiger | |
| 6,201,387 B1 | 3/2001 | Govari | |
| 6,233,476 B1 | 5/2001 | Strommer et al. | |
| 6,246,784 B1 | 6/2001 | Summers et al. | |
| 6,266,551 B1 | 7/2001 | Osadchy et al. | |
| 6,332,089 B1 | 12/2001 | Acker et al. | |
| 6,346,940 B1 | 2/2002 | Fukunaga | |
| 6,366,800 B1 | 4/2002 | Vining et al. | |
| 6,381,485 B1 | 4/2002 | Hunter et al. | |
| 6,387,092 B1 | 5/2002 | Burnside et al. | |
| 6,466,815 B1 | 10/2002 | Saito et al. | |
| 6,496,188 B1 | 12/2002 | Deschamps et al. | |
| 6,501,848 B1 | 12/2002 | Carroll et al. | |
| 6,501,981 B1 | 12/2002 | Schweikard et al. | |
| 6,505,065 B1 | 1/2003 | Yanof et al. | |
| 6,522,907 B1 | 2/2003 | Bladen et al. | |
| 6,526,162 B2 | 2/2003 | Asano et al. | |
| 6,535,756 B1 | 3/2003 | Simon et al. | |
| 6,578,579 B2 | 6/2003 | Burnside et al. | |
| 6,584,174 B2 | 6/2003 | Schubert et al. | |
| 6,603,868 B1 | 8/2003 | Ludwig et al. | |
| 6,611,793 B1 | 8/2003 | Burnside et al. | |
| 6,650,927 B1 | 11/2003 | Keidar | |
| 6,651,669 B1 | 11/2003 | Burnside | |
| 6,694,163 B1 | 2/2004 | Vining | |
| 6,757,557 B1 | 6/2004 | Bladen et al. | |
| 6,783,523 B2 | 8/2004 | Qin et al. | |
| 6,792,390 B1 | 9/2004 | Burnside et al. | |
| 6,829,379 B1 | 12/2004 | Knoplioch et al. | |
| 6,850,794 B2 | 2/2005 | Shahidi | |
| 6,892,090 B2 | 5/2005 | Verard et al. | |
| 6,898,263 B2 | 5/2005 | Avinash et al. | |
| 6,909,913 B2 | 6/2005 | Vining | |
| 6,920,347 B2 | 7/2005 | Simon et al. | |
| 6,925,200 B2 | 8/2005 | Wood et al. | |
| 7,006,677 B2 | 2/2006 | Manjeshwar et al. | |
| 7,072,501 B2 | 7/2006 | Wood et al. | |
| 7,085,400 B1 | 8/2006 | Holsing et al. | |
| 7,096,148 B2 | 8/2006 | Anderson et al. | |
| 7,149,564 B2 | 12/2006 | Vining et al. | |
| 7,167,180 B1 | 1/2007 | Shibolet | |
| 7,174,202 B2 | 2/2007 | Bladen et al. | |
| 7,179,220 B2 | 2/2007 | Kukuk | |
| 7,236,558 B2 | 6/2007 | Saito et al. | |
| 7,301,332 B2 | 11/2007 | Govari et al. | |
| 7,315,639 B2 | 1/2008 | Kuhnigk | |
| 7,324,104 B1 | 1/2008 | Bitter et al. | |
| 7,336,809 B2 | 2/2008 | Zeng et al. | |
| 7,397,937 B2 | 7/2008 | Schneider et al. | |
| 7,428,334 B2 | 9/2008 | Schoisswohl et al. | |
| 7,452,357 B2 | 11/2008 | Vlegele et al. | |
| 7,505,809 B2 | 3/2009 | Strommer et al. | |
| 7,517,320 B2 | 4/2009 | Wibowo et al. | |
| 7,518,619 B2 | 4/2009 | Stoval, III et al. | |
| 7,630,752 B2 | 12/2009 | Viswanathan | |
| 7,630,753 B2 | 12/2009 | Simon et al. | |
| 7,659,912 B2 | 2/2010 | Akimoto et al. | |
| 7,702,153 B2 | 4/2010 | Hong et al. | |
| 7,751,865 B2 | 7/2010 | Jascob et al. | |
| 7,756,316 B2 * | 7/2010 | Odry | G06K 9/4638 382/131 |
| 7,788,060 B2 | 8/2010 | Schneider | |
| 7,792,565 B2 | 9/2010 | Vining | |
| 7,805,269 B2 | 9/2010 | Glossop | |
| 7,809,176 B2 | 10/2010 | Gundel | |
| 7,811,294 B2 | 10/2010 | Strommer et al. | |
| 7,822,461 B2 | 10/2010 | Geiger et al. | |
| 7,901,348 B2 | 3/2011 | Soper et al. | |
| 7,907,772 B2 | 3/2011 | Wang et al. | |
| 7,929,014 B2 | 4/2011 | Akimoto et al. | |
| 7,951,070 B2 | 5/2011 | Ozaki et al. | |
| 7,969,142 B2 | 6/2011 | Krueger et al. | |
| 7,985,187 B2 | 7/2011 | Wibowo et al. | |
| 8,009,891 B2 | 8/2011 | de Vaan | |
| 8,044,972 B2 * | 10/2011 | Hall | A61B 6/502 345/619 |
| 8,049,777 B2 | 11/2011 | Akimoto et al. | |
| 8,055,323 B2 | 11/2011 | Sawyer | |
| 8,102,416 B2 | 1/2012 | Ito et al. | |
| 8,126,241 B2 | 2/2012 | Zarkh et al. | |
| 8,131,344 B2 | 3/2012 | Strommer et al. | |
| 8,170,328 B2 | 5/2012 | Masumoto et al. | |
| 8,199,981 B2 | 6/2012 | Koptenko et al. | |
| 8,200,314 B2 | 6/2012 | Bladen et al. | |
| 8,202,213 B2 | 6/2012 | Ito et al. | |
| 8,208,708 B2 | 6/2012 | Homan et al. | |
| 8,219,179 B2 | 7/2012 | Ganatra et al. | |
| 8,257,346 B2 | 9/2012 | Qin et al. | |
| 8,267,927 B2 | 9/2012 | Dalal et al. | |
| 8,290,228 B2 | 10/2012 | Cohen et al. | |
| 8,298,135 B2 | 10/2012 | Ito et al. | |
| 8,391,952 B2 | 3/2013 | Anderson | |
| 8,417,009 B2 | 4/2013 | Mizuno | |
| 8,494,612 B2 | 7/2013 | Vetter et al. | |
| 8,509,877 B2 | 8/2013 | Mori et al. | |
| 8,672,836 B2 | 3/2014 | Higgins et al. | |
| 8,682,045 B2 | 3/2014 | Vining et al. | |
| 8,696,549 B2 | 4/2014 | Holsing et al. | |
| 8,698,806 B2 | 4/2014 | Kunert et al. | |
| 8,700,132 B2 | 4/2014 | Ganatra et al. | |
| 8,706,193 B2 | 4/2014 | Govari et al. | |
| 8,709,034 B2 | 4/2014 | Keast et al. | |
| 8,730,237 B2 | 5/2014 | Ruijters et al. | |
| 8,768,029 B2 | 7/2014 | Helm et al. | |
| 8,784,400 B2 | 7/2014 | Roschak | |
| 8,798,227 B2 | 8/2014 | Tsukagoshi et al. | |
| 8,798,339 B2 | 8/2014 | Mielekamp et al. | |
| 8,801,601 B2 | 8/2014 | Prisco et al. | |
| 8,819,591 B2 | 8/2014 | Wang et al. | |

(56) References Cited

U.S. PATENT DOCUMENTS

| | | | |
|---|---|---|---|
| 8,862,204 | B2 | 10/2014 | Sobe et al. |
| 9,741,115 | B2 | 8/2017 | Markov et al. |
| 2005/0207630 | A1* | 9/2005 | Chan ................... A61B 6/466 |
| | | | 382/131 |
| 2008/0183073 | A1 | 7/2008 | Higgins et al. |
| 2009/0012390 | A1 | 1/2009 | Pescatore et al. |
| 2009/0030306 | A1 | 1/2009 | Miyoshi et al. |
| 2009/0136103 | A1* | 5/2009 | Sonka ................ G06K 9/4638 |
| | | | 382/128 |
| 2009/0185731 | A1 | 7/2009 | Ray et al. |
| 2010/0310146 | A1* | 12/2010 | Higgins ................... G06T 7/12 |
| | | | 382/131 |
| 2010/0312094 | A1 | 12/2010 | Guttman et al. |
| 2010/0322496 | A1* | 12/2010 | Liu ........................ G06T 19/00 |
| | | | 382/131 |
| 2011/0237897 | A1 | 9/2011 | Gilboa |
| 2011/0251607 | A1 | 10/2011 | Kruecker et al. |
| 2012/0203065 | A1 | 8/2012 | Higgins et al. |
| 2012/0249546 | A1* | 10/2012 | Tschirren ............. G06T 19/00 |
| | | | 345/419 |
| 2012/0280135 | A1 | 11/2012 | Bal |
| 2012/0287238 | A1 | 11/2012 | Onishi et al. |
| 2013/0165854 | A1 | 6/2013 | Sandhu et al. |
| 2016/0005163 | A1* | 1/2016 | Markov ................... G06T 7/11 |
| | | | 382/128 |

OTHER PUBLICATIONS

Ordy et al., Automated airway evaluation system for multi-slice computed tomography using airway lumen diameter, airway wall thickness and broncho-arterial ratio, Procedings Optical Diagnostics of Living Cells II, vol. 6143, Mar. 2, 2006, p. 61430Q-1-61430Q-11 (12 pages).

* cited by examiner

SYSTEM AND METHOD FOR DETECTING TRACHEA

CROSS-REFERENCE TO RELATED APPLICATIONS

The present application is a continuation of U.S. patent application Ser. No. 15/383,044, now U.S. Pat. No. 9,741,115, filed on Dec. 19, 2016, and entitled "SYSTEM AND METHOD FOR DETECTING TRACHEA," and U.S. patent application Ser. No. 14/755,708, now U.S. Pat. No. 9,530,219, filed on Jun. 30, 2015, and entitled "SYSTEM AND METHOD FOR DETECTING TRACHEA," both of which claim the benefit of and priority to U.S. Provisional Patent Application Ser. No. 62/020,257 filed on Jul. 2, 2014, the entire contents of which are incorporated herein by reference.

BACKGROUND

Technical Field

The present disclosure relates to systems and methods for detecting a trachea. More particularly, the present disclosure relates to systems and methods that detect a trachea based on slice images of a three-dimensional volume of a chest.

Discussion of Related Art

Visualization techniques related to visualizing a chest have been developed so as to help clinicians perform diagnoses and/or surgeries on organs or other parts contained within the chest. Visualization is especially important for identifying a location of a diseased region. Further, when treating the diseased region, additional emphasis is given to identification of the particular location of the diseased region so that a surgical operation is performed at the correct location in the chest.

In the past, scanned two-dimensional images of the chest have been used to aid in visualization. In order to visualize a lung from scanned two-dimensional images of the chest, it is important to determine whether or not an area of the two-dimensional images is a part of the lung. Thus, detecting a starting location, for example, a location of an organ or other part that is connected to or is a part of the lung, is also important for identifying the lung. In one example, the trachea can be used as the starting location because the trachea has a substantially constant diameter along its length and is known to be connected to the lung.

SUMMARY

Provided in accordance with the present disclosure is a system for detecting a trachea of a patient.

In an aspect of the present disclosure, the system includes an imaging device configured to obtain image data of the patient, and a computing device including a processor and a memory storing instructions which, when executed by the processor, cause the computing device to generate a three-dimensional (3D) model of a chest of the patient based on the image data, generate slice images of the 3D model along an axial direction, identify a potential connected component in a first slice image of the generated slice images, identify a potential connected component in a second slice image of the generated slice images, wherein the second slice image is immediately subsequent to the first generated slice image, confirm that the potential connected component of the first and second slice images are connected, label the potential connected component as a connected component, label the first slice image as a top slice image of the generated slice images, label the connected component in the top slice image as an active object, associate each connected component in a current slice image of the generated slice images with a corresponding connected component in a previous slice image based on a connectivity criterion, label each connected component in the current slice image associated with a connected component of the preceding slice image as the active object, and identify the active object as the trachea, based on a length of the active object.

In another aspect of the present disclosure, the image data is obtained by an imaging device using a tomographic technique, radiography, tomogram produced by a computerized axial tomography scan, magnetic resonance imaging, ultrasonography, contrast imaging, fluoroscopy, nuclear scans, or positron emission tomography.

In a further aspect of the present disclosure, the instructions further cause the computing device to finalize the active object in the previous slice image.

In another aspect of the present disclosure, the slice images are spaced at an equal distance apart from each other.

In a further aspect of the present disclosure, the instructions further cause the computing device to calculate a length of a finalized active object by multiplying a number of slice images contained in the finalized active object minus one and the distance between each slice image.

In another aspect of the present disclosure, when the length of the finalized active object is greater than or equal to 70 mm, the instructions further cause the computing device to indicate that the trachea is identified.

In a further aspect of the present disclosure, when the length of the finalized active object is greater than or equal to 30 mm but less than 70 mm, the instructions further cause the computing device to indicate that the trachea is potentially identified.

In another aspect of the present disclosure, when the length of the finalized active object is less than 30 mm, the instructions further cause the computing device to indicate that the trachea is not identified.

In a further aspect of the present disclosure, a connected component of the current slice image is associated with the corresponding connected component in the previous slice image when coordinates of a pixel in the connected component of the current slice image matches coordinates of a pixel in the corresponding connected component in the previous slice image.

In another aspect of the present disclosure, a connected component of the current slice image is associated with the corresponding connected component in the previous slice image when a difference between a center of mass of the connected component of the current slice image and a center of mass of the corresponding connected component in the previous slice image is less than a predetermined value.

In a further aspect of the present disclosure, a connected component of the current slice image is associated with a corresponding connected component in the previous slice image when a difference between an area of the connected component of the current slice image and an area of the corresponding connected component in the previous slice image is less than a predetermined value.

In another aspect of the present disclosure, the instructions further cause the computing device to finalize the active object in the previous slice image based on an association parameter, and wherein the association parameter is an area ratio calculated by dividing an area of the connected component in the current slice image by an area of the corresponding connected component in the previous slice image.

In a further aspect of the present disclosure, wherein the instructions further cause the computing device to finalize the active object in the previous slice image based on an association parameter, and wherein the association parameter is a ratio between a number of coordinates of the connected component of the current slice image, which match coordinates of the corresponding active object in the previous slice image, and a number of non-matching coordinates of the connected component of the current slice image In another aspect of the present disclosure, the instructions further cause the computing device to finalize the active object in the previous slice image based on an association parameter, and wherein the association parameter is an area of the connected component of the current slice image.

In a further aspect of the present disclosure, the instructions further cause the computing device to finalize the active object in the previous slice image based on an association parameter, and remove the label of the corresponding active object of the previous slice as an active object when the association parameter is greater than a predetermined value.

In another aspect of the present disclosure, the instructions further cause the computing device to remove the label of the connected component of the current slice as an active object when the association parameter is greater than the predetermined value.

In a further aspect of the present disclosure, the instructions further cause the computing device to finalize the active object in the previous slice image based on an association parameter, and wherein an active object is finalized when the association parameter is less than a predetermined value.

In another aspect of the present disclosure, the instructions further cause the computing device to finalize the active object in the previous slice image based on an association parameter, and label the connected component of the current slice as the active object when the association parameter is greater than or equal to a first predetermined value and less than or equal to a second predetermined value.

Any of the above aspects and embodiments of the present disclosure may be combined without departing from the scope of the present disclosure.

BRIEF DESCRIPTION OF THE DRAWINGS

Objects and features of the presently disclosed systems and methods will become apparent to those of ordinary skill in the art when descriptions of various embodiments are read with reference to the accompanying drawings, of which.

DETAILED DESCRIPTION

Figure 1:
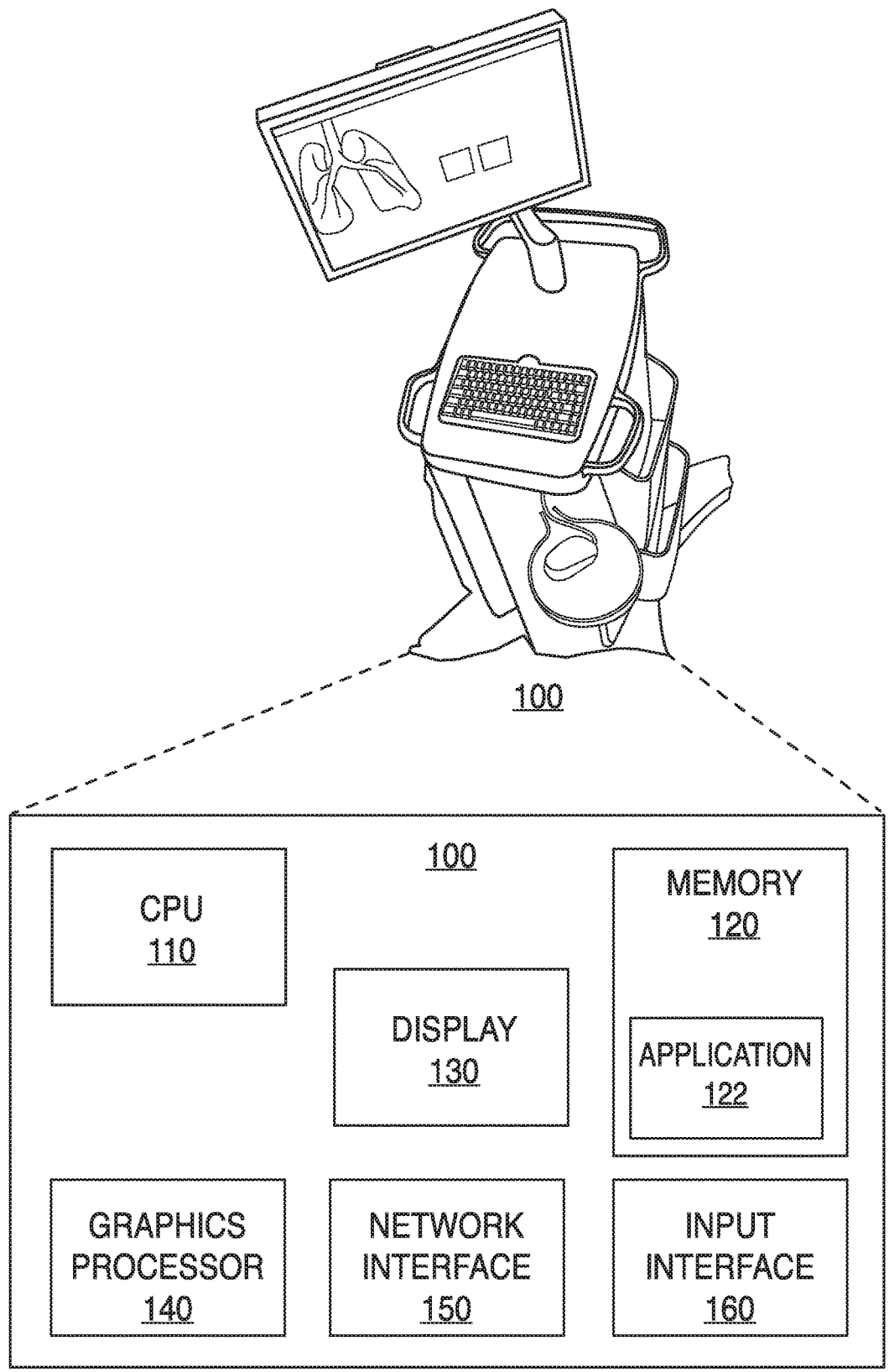
FIG. 1 is a schematic diagram of an example device which may be used to detect a trachea in a 3D model of a patient's lungs, in accordance with an embodiment of the present disclosure.

The present disclosure is related to systems and methods for automatically detecting a trachea based on 2D slice images of a patient's chest. Identifying the trachea may be a necessary component of pathway planning for performing an ELECTROMAGNETIC NAVIGATION BRONCHOSCOPY® (ENB) procedure using an electromagnetic navigation (EMN) system.

An ENB procedure generally involves at least two phases: (1) planning a pathway to a target located within, or adjacent to, the patient's lungs; and (2) navigating a probe to the target along the planned pathway. These phases are generally referred to as (1) "planning" and (2) "navigation." By detecting the trachea, the lung can be visually distinguished from areas outside of the lung because the lung is connected to the trachea. An example of the planning software described herein can be found in U.S. patent application Ser. Nos. 13/838,805, 13/838,997, and 13/839,224, all of which were filed by Covidien LP on Mar. 15, 2013, and entitled "Pathway Planning System and Method," all of which are incorporated herein by reference. An example of the planning software can be found in commonly assigned U.S. Provision Patent Application No. 62/020,240 entitled "SYSTEM AND METHOD FOR NAVIGATING WITHIN THE LUNG" the entire contents of which are incorporated herein by reference.

Prior to the planning phase, the patient's lungs are imaged by, for example, a computed tomography (CT) scan, although additional applicable methods of imaging will be known to those skilled in the art. The image data assembled during the CT scan may then be stored in, for example, the Digital Imaging and Communications in Medicine (DICOM) format, although additional applicable formats will be known to those skilled in the art. The CT scan image data may then be loaded into a planning software application ("application") to be processed for generating a 3D model which may be used during the planning phase of the ENB procedure.

The application may use the CT scan image data to generate a 3D model of the patient's lungs. The 3D model may include, among other things, a model airway tree corresponding to the actual airways of the patient's lungs, and showing the various passages, branches, and bifurcations of the patient's actual airway tree. While the CT scan image data may have gaps, omissions, and/or other imperfections included in the image data, the 3D model is a smooth representation of the patient's airways, with any such gaps, omissions, and/or imperfections in the CT scan image data filled in or corrected.

The planning phase generally involves identifying at least one target in the 3D model, and generating a pathway to the target. The pathway will generally run from the patient's mouth, through the trachea and connected airways, to the target. However, in order to generate the pathway to the target, the location of the trachea within the 3D model must be known.

As described in more detail below, the application will attempt to automatically detect the trachea within the 3D model. However, there may be instances where automatic detection of the trachea fails. In such instances, the trachea may need to be manually identified and marked. This process is more fully described in commonly-owned U.S. Provisional Patent Application Ser. No. 62/020,253 entitled "Trachea Marking", filed on Jul. 2, 2014, by Lachmanovich et al., the entire contents of which are hereby incorporated by reference.

The trachea provides a passage way for breathing. The trachea is connected to the larynx and the pharynx in the upper end. In particular, the upper part of the trachea extends substantially linearly from the larynx and pharynx and behind the sternum. The lower end of the trachea branches into a pair of smaller tubes, i.e., primary bronchi, each tube connecting to a lung. The main carina is a cartilaginous ridge formed by the branching of the trachea into the primary bronchi. The diameter of the trachea is substantially constant along its length (i.e., the axial direction), while the size of the lung changes substantially along the same direction as the length of the trachea. Thus, by analyzing 2D slice images of the 3D model, the trachea may be detected.

Figure 2:
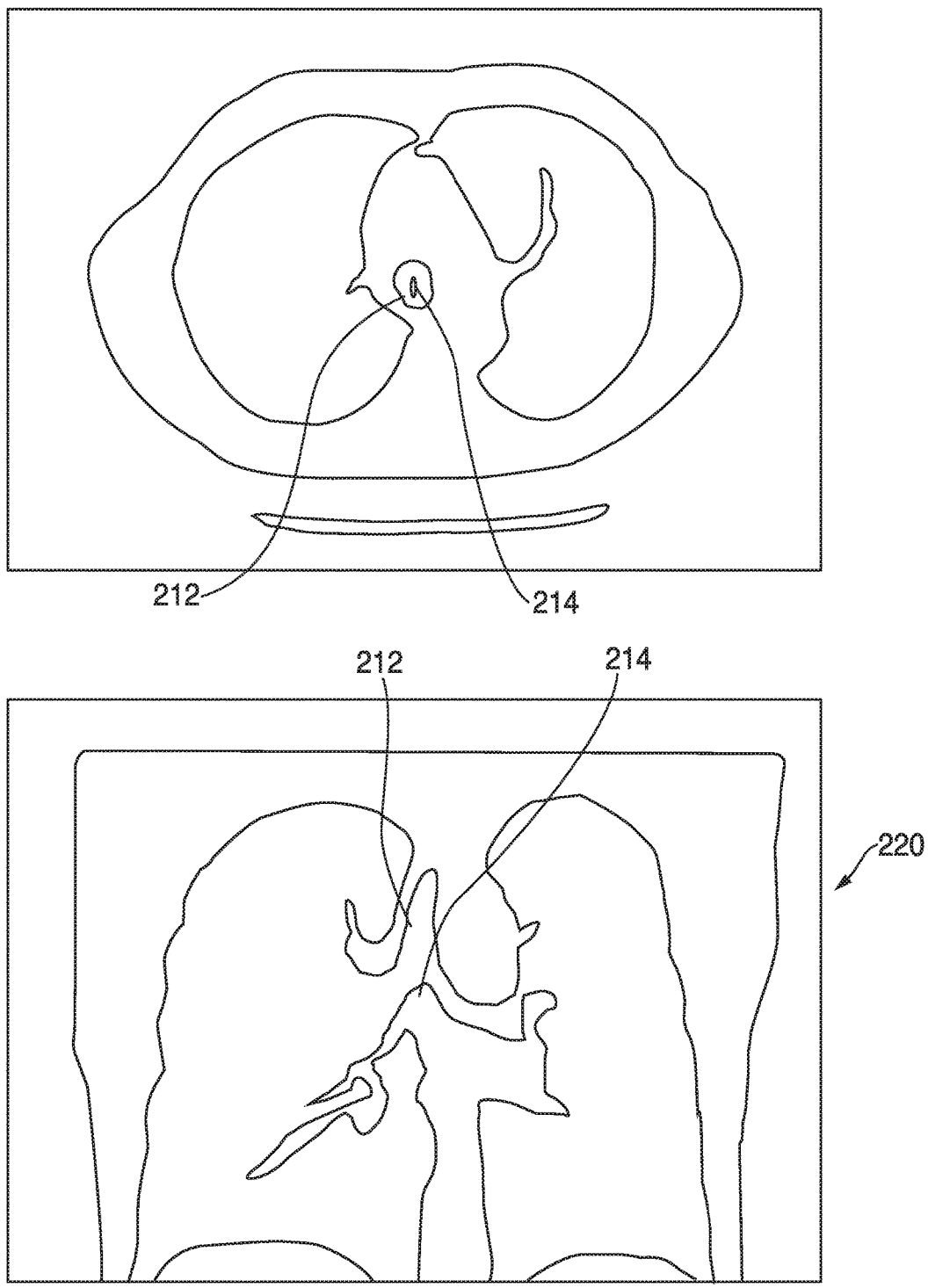
FIG. 2 depicts 2D slice images generated from the 3D model showing the trachea in the axial and coronal orientations, in accordance with embodiments of the present disclosure.

FIG. 1 shows an image processing device 100 that may be used during the planning phase of an ENB procedure to detect the location of the trachea in the 3D model. Device 100 may be a specialized image processing computer configured to perform the functions described below. Device 100 may be embodied in any form factor known to those skilled in the art, such as, a laptop, desktop, tablet, or other similar computer. Device 100 may include, among other things, one or more processors 110, memory 120 storing, among other things, the above-referenced application 122, a display 130, one or more specialized graphics processors 140, a network interface 150, and one or more input interfaces 160. As noted above, 2D slice images of the 3D model may be displayed in various orientations. As an example, FIG. 2 shows 2D slice images of the 3D model of the patient's lungs in the axial and coronal orientations, with 2D slice image 210 generated along the axial plane and 2D slice image 220 generated along the coronal plane.

Both 2D slice images 210 and 220 show the trachea 212 and the main carina 214. The 2D slice images of the 3D model may show a high density area with high intensity and a low density area with low intensity. For example, bones, muscles, blood vessels, or cancerous portions are displayed with higher intensity than an inside area of airways of the lung.

In an aspect, the 2D slice images may be generated to depict the axial, coronal, and sagittal views of the patient at a given location. For example, at each intersecting point of the 3D model, there may be three different 2D slice images generated in the three independent directions. These 2D slice images may be reformatted for display. For example, application 122 may convert a color space of the 2D slice images to another color space suitable for display and perform imaging processes, e.g., scale, rotation, translation, or projection, to display the 2D slice images as intended.

The 2D slice images may be binarized by using a region growing algorithm. Based on the region growing algorithm and starting with a seed pixel, every pixel in the 2D slice images of the 3D model is checked to determine whether a Hounsfield value assigned to each pixel is less than a threshold value and whether each pixel is connected to the seed pixel. When it is determined that a value assigned to a pixel has a Hounsfield value less than the threshold value and is connected to the seed pixel, the Hounsfield value of the pixel is set to one or the maximum value. Otherwise, the Hounsfield value of the pixel is set to zero or the minimum value. As part of the region growing algorithm, the threshold is selected with a high enough value to cause leakage in the lung, and thus fill the lungs with intensity values leaked from the airways.

After every pixel in the 2D slice images of the 3D model is set to the maximum or minimum value, the 2D slice images will have only 2 colors of pixels. The result is a set of 2D slice images where the pixels having the maximum Hounsfield value would appear white, and the pixels having the minimum Hounsfield value would appear black. In some instances, the values of pixels in the 2D slice images of the 3D model are inversed so that the lung regions are shown in black and the non-lung regions are shown in white or another color. The binarized 2D slice images may show white regions as non-lung areas (e.g., bones, stomach, heart, blood vessels, walls of airways, etc.) and black regions as lung areas (e.g., the lung, the trachea, and connected components). As described in more detail below, connected components are areas of a 2D slice image which are identified as having corresponding areas in one or more of the other 2D slice images, and thus may represent the patient's lungs or trachea.

Figure 3:
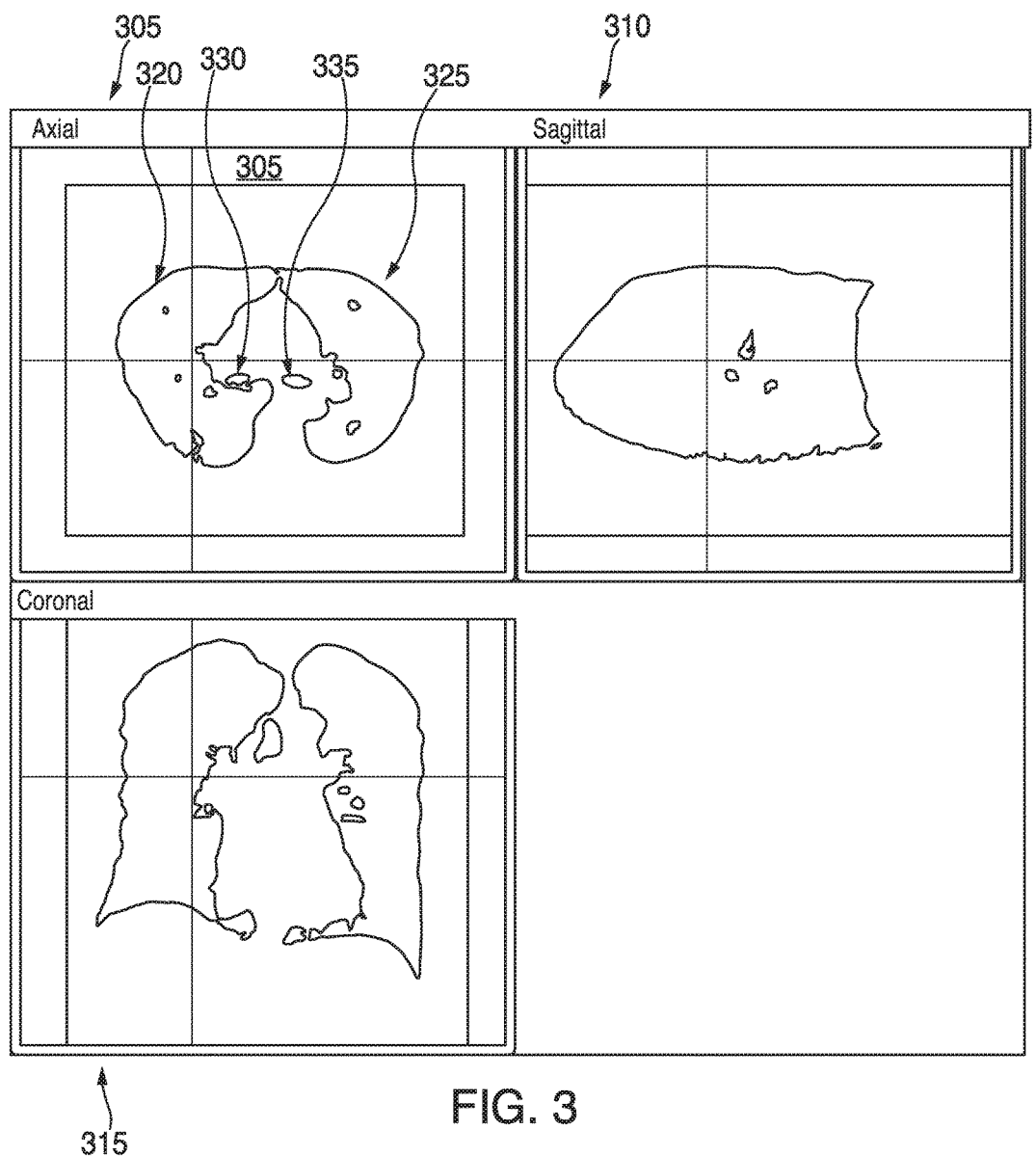
FIG. 3 is a graphical illustration of connected components in 2D slice images of a a patient's chest in accordance with embodiments of the present disclosure.

FIG. 3 illustrates three 2D slice images generated based on the 3D model in accordance with an embodiment of the present disclosure. Image 305 is generated along the axial direction, image 310 is generated along the sagittal direction, and image 315 is generated along the coronal direction. Black areas shown in the three images 305, 310, and 315 are lung regions, and white areas included in the three images 305, 310, and 315 are non-lung areas. The white areas may represent blood vessels and walls of airways. In a case where an interior area of connected components is sufficiently large and has a lower density (e.g., blood, air, or coarse space) than tissue making up the lung regions, a black area also appears. In this sense, the connected components include a lung area as well. For example, connected components in the image 305 are the left lung 320, the right lung 325, the left primary bronchus 330, and the right primary bronchus 335. White areas inside the left lung 320 and the right lung 325 are not connected components but are blood vessels or walls of airways.

The upper part of the trachea extends substantially linearly from the larynx and pharynx and behind the sternum or breastbone. The lower end of the trachea branches into a pair of smaller tubes, i.e., primary bronchi, each tube connecting to a lung. The diameter of the trachea is substantially constant along its length (i.e., the axial direction), while the size of the lung changes substantially along the same direction as the length of the trachea. Thus, by analyzing areas of connected components in each 2D slice image generated based on the 3D model, the trachea may be detected. For this reason, images generated along the axial direction may be analyzed to detect the trachea in this present disclosure. In other embodiments, images generated along the other two directions may also be used to detect the trachea.

Figure 4:
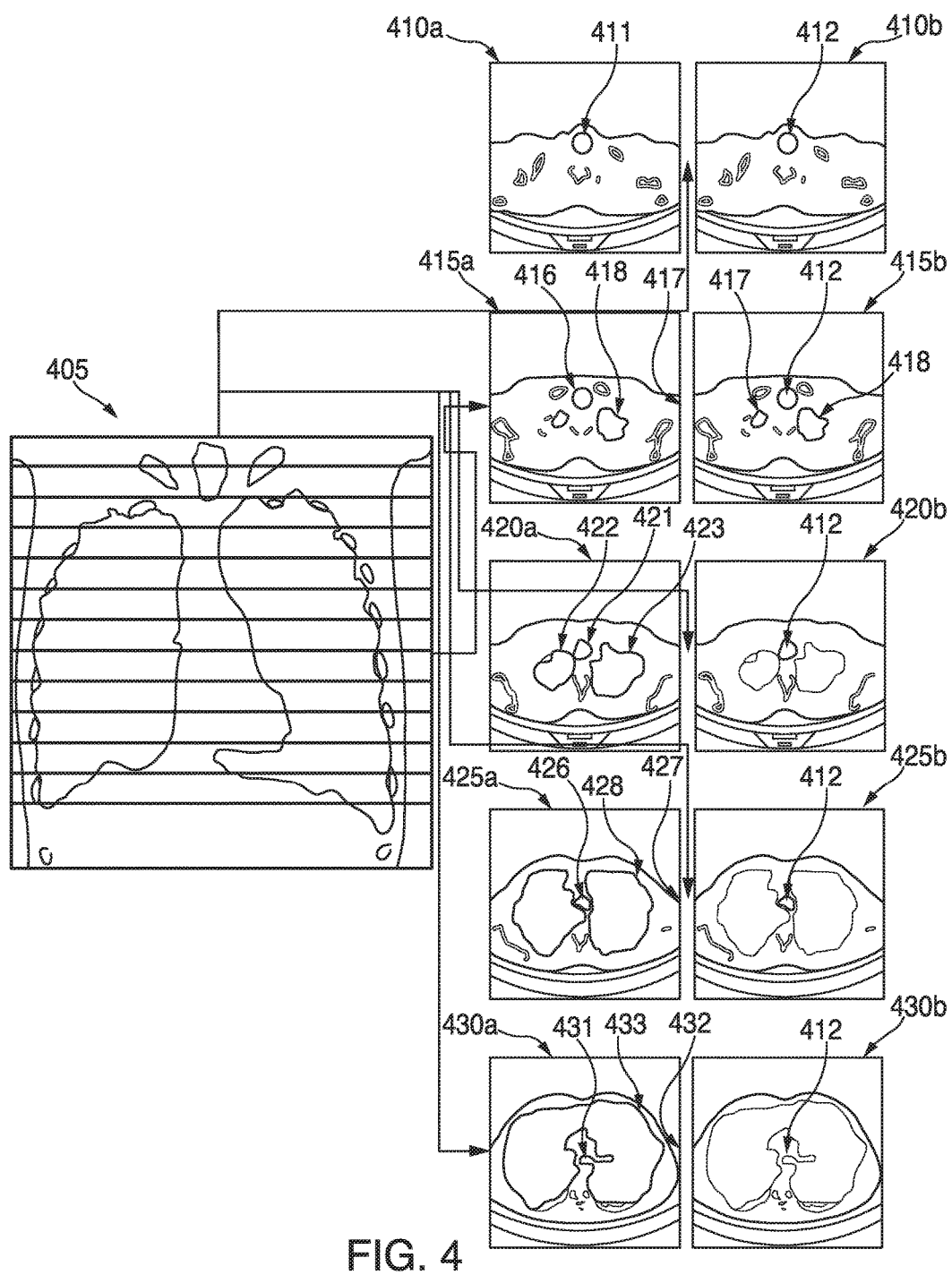
FIG. 4 is a graphical illustration of a planar view of 2D slice images of the patient's chest in accordance with embodiments of the present disclosure.

FIG. 4 shows 2D slice images generated from the 3D model in accordance with embodiments of the present disclosure. Image 405 is a coronal image of the patient depicting the axial locations along the patient at which axial images 410a-430b are identified and processed in accordance with the present disclosure. For example, image 410a is taken from an axial position along the chest indicated by the top gray line, image 415a is taken from another axial position along the chest indicated by the second gray line, image 420*a* is taken from another axial position along the chest indicated by the third gray line, etc.

The axial locations of the images 410*a*-430*b* may be spaced an equal distance from each other, meaning that a distance between any two neighboring 2D slice images is the same distance D. The axial 2D slice images 410*a*, 415*a*, 420*a*, 425*a*, and 430*a* depict a portion of the chest of the patient at different locations. As a result of the binarization, each of these images 410*a*, 415*a*, 420*a*, 425*a*, and 430*a* show black enclosed areas which represent the trachea and or the lung tissue.

A process for detecting the trachea may be based on the identified connected components in each axial 2D slice image 410*a*, 415*a*, 420*a*, 425*a*, and 430*a*. Generally, a first axial 2D slice image is analyzed to identify one or more identified areas which satisfy the binarization criteria (i.e., are likely either trachea or lung). In addition to identifying areas of the axial 2D slice image which satisfy the binarization criteria, an initial connected component analysis is done which filters out any portion of the axial 2D slice image 410*a* that connects to the picture borders. Further, connected components which are above or below a certain size threshold are also filtered out. The remaining connected components of any one axial image slice, e.g. 410*a*, is associated with an active object depending on a connectivity criteria with the connected components in other images. An axial connected component analysis is undertaken in which a determination is made as to whether connected components in two successive axial 2D slice images geographically overlap with one another. Geographical overlap can be determined by comparing coordinates of the active object in the successive images and determining if the same coordinates (e.g. X and Y coordinates) appear in the active objects of successive images. If so, the connected components from the two axial 2D slice images are associated with each other and are both correspondingly labeled as an active object. A connected component labeled as the active object is a candidate to be identified as the trachea. When the additional connected components do not geographically overlap with the one or more connected components from the previous 2D slice image, the additional connected components are labeled as a new active object. Further, if in a subsequent axial slice it is determined that there are no connected components objects which overlap with the preceding image, the active object last identified in the preceding image is finalized. The above-described steps are performed on each 2D slice image until each connected component in each coronal 2D slice image is identified and, where appropriate, classified as an active object.

The details of the process described above are further clarified with reference to FIG. 4. In an embodiment, the top axial 2D slice image 410*a* is processed first to identify or label the connected component 411. In one embodiment, any connected component in the top axial 2D slice image 410*a* is labeled as an active object. As a result, in image 410*b* of the filtering described above, a single active object 412 is shown.

Next, the second axial 2D slice image 415*a* is processed in a similar manner as coronal 2D slice image 410*a* to identify three connected components 416, 417, and 418. Again, the filtering described above is undertaken, resulting in the identification of three active objects 416, 417, and 418 depicted in image 415*b*. A determination is made as to whether one or more of the connected components 416-418 geographically overlap with connected components (e.g., 411) in the previous axial 2D slice image. As a result of this analysis, active objects 413 and 414 are new active objects, with no connected component to compare with in the preceding axial 2D slice image 410*b*. However, connected component 416 geographically overlaps with and is associated with the connected component 411 in the 2D slice image 410*a*, thus, connecting the two connected components 416 and 411 vertically (i.e. from axial slice to axial slice) to each other. As a result the associated connected components 416 and 411 share a common active object label 412

With reference to a third axial 2D slice image 420*a*, three connected components 421-423 are identified. Following the filtering described above, each connected component 421-423 is separately compared with the connected components 416-418 of the second axial 2D slice image 415*a*. The connected component 421 geographically overlaps with the connected component 416, and has a similar size or area with that of the connected component 416. Thus, the connected component 421 is associated with the connected component 416 and labeled as the same active object 412 as the connected component 416, which was based on its comparison to connected component 411 in axial image slice 410*a*.

The connected components 422 and 423 geographically overlap with the connected components 417 and 418, respectively and are thus candidates to be labeled as active objects 413 and 414 based on this overlap. The connected components 422 and 423, however, must also be filtered by size, as described above. Because the areas of the connected components 422 and 423 are larger than a predetermined maximum size they must be filtered out of consideration as an active object. In FIG. 420*b*, these connected components are shown as filtered out based on the change of color from black to white. In contrast, connected component 421, which is associated with active object 412 remains black. In the context of the present disclosure, because the trachea is known to have a substantially consistent diameter along its length, and because that diameter is generally within a well known range of between about 27 and 13 mm for men, and between about 23-10 mm in women, when a connected component is identified as having a substantially larger area than an area of the corresponding connected component in the previous 2D slice image, an organ represented by such connected component is determined to be something other than the trachea and thus excluded from the analysis. As an alternative or additional step, because the connected components 422 and 423 have areas that are larger than those of connected components 416 and 418, the connected components 422 and 423 may also be considered too large and thus not part of the trachea. Further, the connected components 417 and 418 of the second axial 2D slice image 415*b* may be re-labeled to remove the active object designation. Consequently, the 2D slice images 410*b*, 415*b* and 420*b* have only one active object 412.

As described briefly above, a connected component of separate 2D slice images may be associated with a connected component of an adjacent upper 2D slice image based on connectivity criteria. The connectivity criteria may include consideration of equality of coordinates on the current 2D slice image with coordinates of the adjacent upper 2D slice image. In an embodiment, the coordinates of a pixel of a 2D slice image may be based on the Cartesian coordinate system, where the origin may be located in an upper left corner of the 2D slice image and coordinates increase from left to the right and from top to bottom. Alternatively, the coordinates of a pixel may be based on another coordinate system, such as polar coordinate system, which is suitable for intended purposes.

The geometric overlap between two connected components, also called an association parameter, from two different images may be calculated may be based on the number of pixels of a connected component of the current 2D slice image which match coordinates of pixels of a connected component of the adjacent upper 2D slice image. Alternatively the overlap may be assessed based on a center of mass. That is, when a center of mass of a connected component of the current 2D slice image is similar to that of a connected component of the adjacent upper 2D slice image, the connected component of the current 2D slice image is associated with the connected component of the adjacent upper 2D slice image. The center of mass may be calculated with an equal weight to every pixel in a connected component as follows:

$$C_x = \frac{\sum_{i=1}^{N} x_i}{N} \text{ and } C_y = \frac{\sum_{i=1}^{N} y_i}{N},$$

where $C_x$ and $C_y$ are x-axis and y-axis coordinates of the center of mass, respectively, $x_i$ and $y_i$ are coordinates of the i-th pixel of a connected component, and N is the total number of pixels contained in the connected component.

In another aspect, the connectivity criteria may be based on an area ratio. In particular, a ratio of an area of a non-overlapping portion of a connected component of the current 2D slice image to an area of an overlapping area of the connected component of the current slice may be compared with a first predetermined value. For example, the ratio may be computed by dividing an area of an overlapping portion of a connected component of the adjacent upper 2D slice image by an area of a non-overlapping portion of the connected component of the adjacent upper 2D slice image. When the ratio is less than the first predetermined value, the connected component of the current 2D slice image and the corresponding connected component of the adjacent upper 2D slice image are associated.

Returning to FIG. 4, a fourth axial 2D slice image 425a is taken along the axial direction where three connected components 426-428 are detected. Using the connectivity criteria and filtering techniques described above, the connected component 426 is associated with the connected component 421, the connected component 427 is associated with connected component 422, and the connected component 428 is associated with the connected component 423. Since the connected components 422 and 423 were previously filtered out as being tool larger and not given the label active object, the connected components 427 and 428 are also filtered out and not designated as active objects in FIG. 425b. The connected component 426, however, is associated with the connected component 421, and is ultimately labeled as part of active object 412, as shown in the image 425b.

Axial 2D slice image 430a is the fifth 2D slice image from the top 2D slice image 410a. Again, three connected components 431-433 are detected in the 2D slice image 430a. Based on the connectivity criteria and the filtering processes described above, the connected component 431 is associated with the connected component 426, the connected component 432 is associated with connected component 427, and the connected component 433 is associated with the connected component 428. As in image 425b, because the connected components 427 and 428 are too larger to be labeled as active objects, the connected components 432 and 433 are likewise not associated with an active objects and are removed from the analysis. The connected component 431 however, is associated with the connected component 426 is, which has previously been associated with active object 412 as shown in the image 430b.

As shown in the 2D slice images 430a and 430b, the area of the connected component 431 is small compared to the area of the connected component 426 in the 2D slice image 425a, the connected component 421 in the 2D slice image 420a, the connected component 416 in the 2D slice image 415a, and the connected component 411 in the 2D slice image 410a, all of which are associated with the active object 412. In at least one embodiment because the ratio of the area of the connected component 431 to the area of the connected component 426 of the 2D slice image 425a is below a threshold, the active object 412 including the connected components 411, 416, 421, 426, and 431 may be finalized, meaning that the active object 412 is closed. After the active object is finalized, no other connected components are associated with the active object.

When the active object 412 is finalized, the length of the active object may be calculated by multiplying the number of 2D slice images containing the active object by the distance between adjacent 2D slice images. Based on the length of the active object, a determination is made as to whether the active object is the trachea. In an aspect, if the length of the active object is greater than 70 millimeters (mm), the active object is identified as the trachea. In another aspect, if the length of the active object is greater than or equal to 30 mm and less than or equal to 70 mm, the active object is identified as the trachea. When the length of the active object is less than 30 mm, the active object is not identified as the trachea.

Figure 5A:
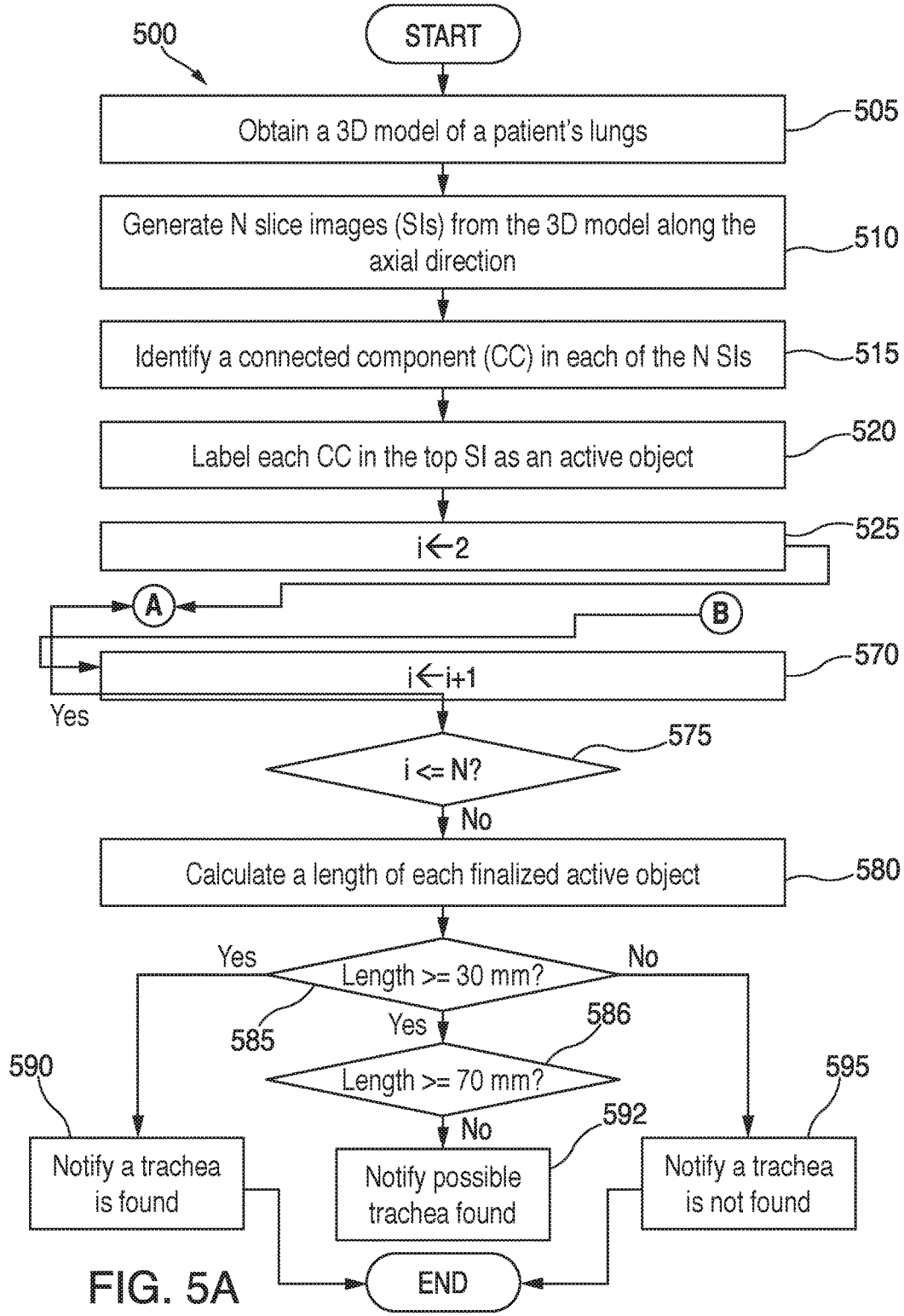
FIG. 5A is a flowchart of a method for detecting a trachea in accordance with embodiments of the present disclosure.
Figure 5B:
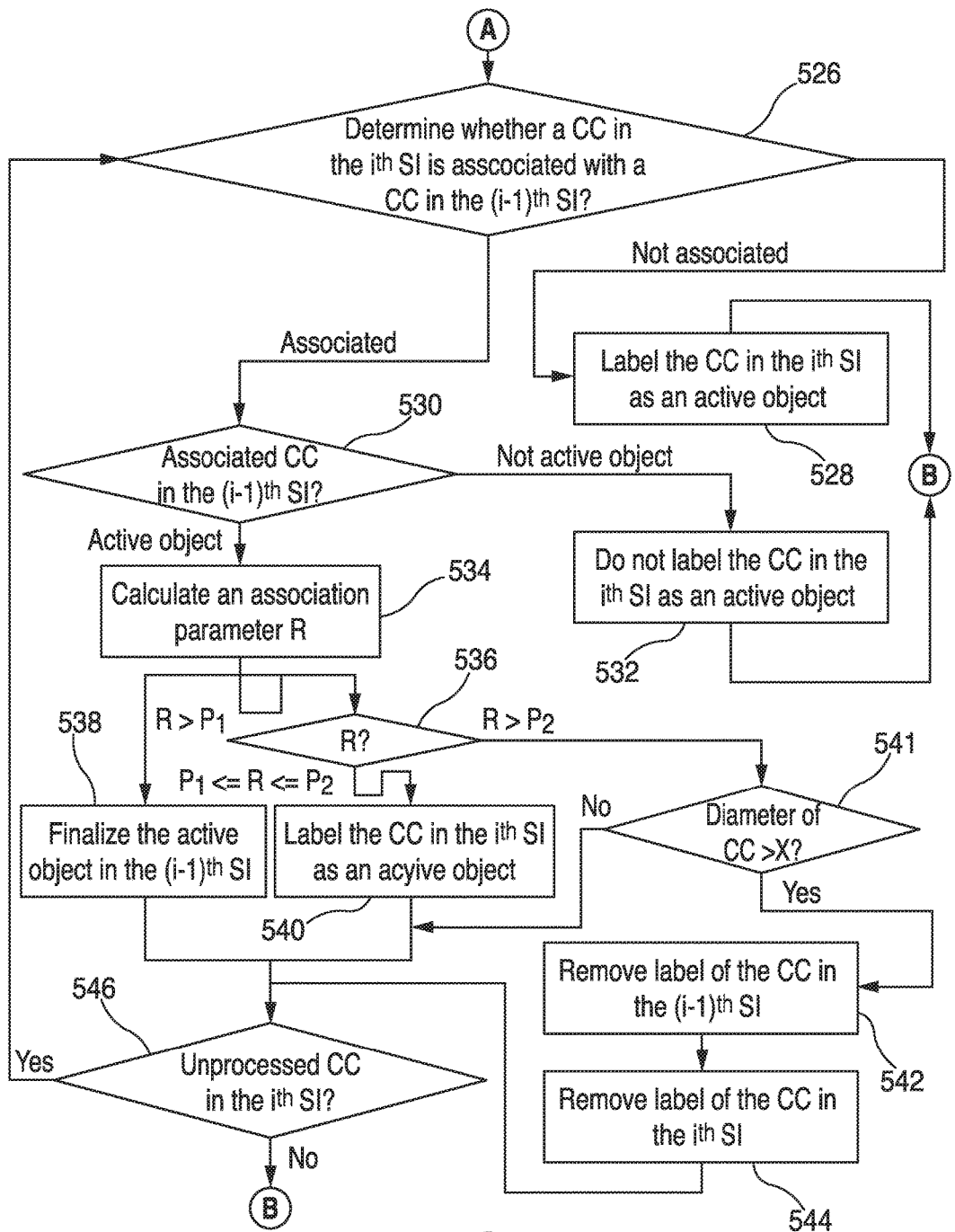
FIG. 5B is a flowchart of a method for determining an association between 2D slice images in accordance with embodiments of the present disclosure.

FIGS. 5A and 5B are flowcharts of a method 500 for automatically detecting a trachea in accordance with an embodiment of the present disclosure. The method 500 starts at step 505, in which a 3D model of a patient's lungs is generated. The 3D model may be based on CT scan image data obtained during a CT scan of the patient's chest and stored in the DICOM image format. In an aspect, the imaging modality may also be radiography, tomogram produced by a CAT scan, MRI, ultrasonography, contrast imaging, fluoroscopy, nuclear scans, and PET.

In step 510, 2D slice images may be generated from the 3D model. The generated 2D slice images may be binarized 2D slice images including only include black and white pixels. The 2D slice images may be generated along the axial direction. Alternatively, the 2D slice images are generated along a direction other than the axial direction. In an aspect, the 2D slice images are generated at an equal distance apart so that a distance between any two 2D slice images may be easily calculated. In another aspect, the 2D slice images may be generated at different distances but may include distance information indicating how far apart each 2D slice image is from the top 2D slice image.

In step 515, a connected component is identified in the 2D slice images. As noted above, connected components are enclosed regions in each image, with only one color pixels (e.g., black as shown in FIG. 4). Any connected component identified in the top 2D slice image is labeled as an active object in step 520. Active objects are considered as candidates for the trachea. In step 525, a counter i is set to two, and the next 2D slice image is examined.

FIG. 5B shows a flowchart for associating and labeling connected components as a part of the method 500 for automatically detecting a trachea. In step 526, a determination is made as to whether a connected component in the ith 2D slice image is associated with a connected component in the (i−1)th 2D slice image. In an aspect, a connected component in a current 2D slice image may be associated with a connected component in the previous 2D slice image based on a location of the connected component of each of the current and previous 2D slice images. When the connected components overlap, they are associated with each other. Otherwise, the connected components are not associated.

When a determination is made that a connected component in the current 2D slice image (i.e., ith 2D slice image) is not associated with a connected component in the previous 2D slice image (i.e., (i−1)th 2D slice image), the connected component of the current 2D slice image is labeled as an active object in step 528. Step 570 (FIG. 5A) is then performed.

When a determination is made that a connected component in the current 2D slice image is associated with a connected component in the previous 2D slice image in step 526, another determination is made as to whether the connected component of the previous 2D slice image is an active in step 530. After the labeling process, step 570 of FIG. 5A follows.

In a case where the connected component of the previous 2D slice image is labeled as an active object, an association parameter R is calculated between the connected components of the current 2D slice image and the previous 2D slice image in step 534. The association parameter is based on connectivity criteria, which is used to determine whether two connected components of neighboring 2D slice images are closely related.

In an aspect, the association parameter is an area ratio, which is a ratio of an area of a connected component of the current 2D slice image to an area of the corresponding connected component of the previous 2D slice image. In step 536, the association parameter is compared with two predetermined values. In a case where the association parameter R is less than a first predetermined value $P_1$, the connected component, which is labeled as the active object, of the previous 2D slice image is finalized in step 538. This case occurs when the area of the connected component of the current 2D slice image decreases significantly or is completely missing. For example, since the lower end of the trachea branches out, an image of the bottom of the trachea may show a connected component, an area of which is much smaller than a cross-sectional area of the trachea. The significant decrease in the area of a connected component may indicate that the bottom of a trachea is reached.

When the association parameter R is greater than or equal to the first predetermined value $P_1$ but less than or equal to a second predetermined value $P_2$, the connected component of the current 2D slice image is labeled as the active object in step 540. In this case, the connected component of the current 2D slice image is considered a continuation of the active object identified in the preceding 2D slice images (e.g., a trachea candidate).

When the association parameter R is greater than the second predetermined value $P_2$, the label of the connected component of the previous 2D slice image may be removed such that it is not labeled as an active object in step 542. This occurs when the area of the connected component of the current 2D slice image increases significantly. As a result, the association parameter may reach 100%. In such instances a second inquiry is made at step 541 as to whether the diameter of the connected component of the current image slice is greater than a predetermined threshold, for example 30 mm for a man and 25 mm for a woman. Such a diameter of connected component would indicate that connected component cannot be the trachea. Thus, the connected component of the previous 2D slice image is not considered as a trachea. In step 544, the label of the connected component of the current 2D slice image is also removed such that it is not labeled as an active object.

After steps 538, 540, and 544, a determination is made as to whether there is an unprocessed connected component in the current 2D slice image. When a determination is made that an unprocessed connected component exists, steps 526-546 are repeated until no additional unprocessed connected components are found in the current 2D slice image. When a determination is made that there are no more unprocessed connected components in the current 2D slice image, step 570 of FIG. 5A follows.

Turning now to FIG. 5A, the counter i is increased by one in step 570. In step 575, the counter i is compared with the number of 2D slice images, N. When the counter i is less than or equal to the number of 2D slice images, N, the method reiterates at step 526 illustrated in FIG. 5A. Otherwise, all connected components in each 2D slice image are processed. In step 580, a length of the active object is calculated.

In steps 585 and 586, the length of the active object is compared with a predetermined range of values. At step 590, if the length of the active object is larger than the predetermined values, it is determined to be the trachea. Similarly, at step 592, if the length of the active object is within the predetermined range, it is labeled as potentially being the trachea, and a clinician may have to confirm this before the next step of the ENB procedure can be undertaken. At step 595, if the active objects are smaller than the predetermined range, automatic detection of the trachea fails, and manual identification and marking of the trachea is necessary. In an aspect, the predetermined range is 30 mm to 70 mm. Thus, if the length of an active object is more than 70 mm, it is determined to be the trachea, and if the length of an active object is between 30 mm and 70 mm, it is labeled as potentially being the trachea. In this way, the method 500 automatically detects a trachea from the 2D slice images.

Returning now to FIG. 1, memory 120 includes application 122 such as EMN planning and procedure software and other data that may be executed by processors 110. For example, the data may be the CT scan image data stored in the DICOM format and/or the 3D model generated based on the CT scan image data. Memory 120 may also store other related data, such as medical records of the patient, prescriptions and/or a disease history of the patient. Memory 120 may be one or more solid-state storage devices, flash memory chips, mass storages, tape drives, or any computer-readable storage media which are connected to a processor through a storage controller and a communications bus. Computer readable storage media include non-transitory, volatile and non-volatile, removable and non-removable media implemented in any method or technology for storage of information such as computer-readable instructions, data structures, program modules or other data. For example, computer-readable storage media includes random access memory (RAM), read-only memory (ROM), erasable programmable read only memory (EPROM), electrically erasable programmable read only memory (EEPROM), flash memory or other solid state memory technology, CD-ROM, DVD or other optical storage, magnetic cassettes, magnetic tape, magnetic disk storage or other magnetic storage devices, or any other medium which can be used to store desired information and which can be accessed by device 100.

Display 130 may be touch-sensitive and/or voice-activated, enabling display 130 to serve as both an input device and an output device.

Graphics processors 140 may be specialized graphics processors which perform image-processing functions, such as processing the CT scan image data to generate the 3D model, and process the 3D model to generate the 2D slice images of the 3D model in the various orientations as described above, as well as the 3D renderings of the 3D model. Graphics processors 140 may further be configured to generate a graphical user interface (GUI) to be displayed on display 130. The GUI may include views showing the 2D image slices, the 3D rendering, among other things. In embodiments, graphics processors 140 may be specialized graphics processors, such as a dedicated graphics processing unit (GPU), which performs only the image processing functions so that the one or more general processors 110 may be available for other functions. The specialized GPU may be a stand-alone dedicated graphics card, or an integrated graphics card.

Network interface 150 enables device 100 to communicate with other devices through a wired and/or wireless network connection. In an embodiment, device 100 may receive the CT scan image data from an imaging device via a network connection. In other embodiments, device 100 may receive the CT scan image data via a storage device, such as a disk or other external storage media known to those skilled in the art.

Input interface 160 is used for inputting data or control information, such as setting values, text information, and/or controlling device 100. Input interface 160 may include a keyboard, mouse, touch sensor, camera, microphone, or other data input devices or sensors used for user interaction known to those skilled in the art.

Further aspects of image and data generation, management, and manipulation useable in either the planning or navigation phases of an ENB procedure are more fully described in commonly-owned U.S. Provisional Patent Application Ser. No. 62/020,220 entitled "Real-Time Automatic Registration Feedback", filed on Jul. 2, 2014, by Brown et al.; U.S. Provisional Patent Application Ser. No. 62/020,177 entitled "Methods for Marking Biopsy Location", filed on Jul. 2, 2014, by Brown; U.S. Provisional Patent Application Ser. No. 62/020,240 entitled "System and Method for Navigating Within the Lung", filed on Jul. 2, 2014, by Brown et al.; U.S. Provisional Patent Application Ser. No. 62/020,238 entitled "Intelligent Display", filed on Jul. 2, 2014, by Kehat et al.; U.S. Provisional Patent Application Ser. No. 62/020,242 entitled "Unified Coordinate System for Multiple CT Scans of Patient Lungs", filed on Jul. 2, 2014, by Greenburg; U.S. Provisional Patent Application Ser. No. 62/020,245 entitled "Alignment CT", filed on Jul. 2, 2014, by Klein et al.; U.S. Provisional Patent Application Ser. No. 62/020,250 entitled "Algorithm for Fluoroscopic Pose Estimation", filed on Jul. 2, 2014, by Merlet; U.S. Provisional Patent Application Ser. No. 62/020,261 entitled "System and Method for Segmentation of Lung", filed on Jul. 2, 2014, by Markov et al.; U.S. Provisional Patent Application Ser. No. 62/020,258 entitled "Cone View—A Method of Providing Distance and Orientation Feedback While Navigating in 3D", filed on Jul. 2, 2014, by Lachmanovich et al.; and U.S. Provisional Patent Application Ser. No. 62/020,262 entitled "Dynamic 3D Lung Map View for Tool Navigation Inside the Lung", filed on Jul. 2, 2014, by Weingarten et al., the entire contents of all of which are hereby incorporated by reference.

Although embodiments have been described in detail with reference to the accompanying drawings for the purpose of illustration and description, it is to be understood that the inventive processes and apparatus are not to be construed as limited thereby. It will be apparent to those of ordinary skill in the art that various modifications to the foregoing embodiments may be made without departing from the scope of the disclosure.

What is claimed is:

1. A method for detecting a trachea of a patient, the method comprising:
  obtaining a three-dimensional (3D) model of a patient's chest;
  generating a plurality of slice images of the 3D model along an axial direction;
  identifying a connected component in each of the plurality of slice images;
  labeling the connected component in a top slice image of the plurality of slice images as an active object;
  associating the connected component in a current slice image of the plurality of slice images with a corresponding connected component in a previous slice image of the plurality of slice images based on a connectivity criterion;
  labeling each connected component in the current slice image associated with a connected component in the previous slice image as the active object; and
  identifying the active object as the trachea, based on a length of the active object.

2. The method according to claim 1, wherein the 3D model is generated based on image data obtained by an imaging device using a tomographic technique, radiography, a tomogram produced by a computerized axial tomography scan, magnetic resonance imaging, ultrasonography, contrast imaging, fluoroscopy, nuclear scans, or positron emission tomography.

3. The method according to claim 1, further comprising finalizing the active object in the previous slice image.

4. The method according to claim 3, wherein the plurality of slice images are spaced at an equal distance apart from each other.

5. The method according to claim 4, further comprising calculating a length of a finalized active object by multiplying a number of the plurality of slice images including the finalized active object minus one and the distance between each slice image.

6. The method according to claim 5, wherein, when the length of the finalized active object is greater than or equal to 70 mm, the method further comprises indicating that the trachea is identified.

7. The method according to claim 5, wherein, when the length of the finalized active object is greater than or equal to 30 mm but less than 70 mm, the method further comprises indicating that the trachea is potentially identified.

8. The method according to claim 5, wherein, when the length of the finalized active object is less than 30 mm, the method further comprises indicating that the trachea has not been identified.

9. The method according to claim 3, further comprising finalizing the active object in the previous slice image based on an association parameter,
  wherein the association parameter is an area ratio calculated by dividing an area of the connected component in the current slice image by an area of the corresponding connected component in the previous slice image.

10. The method according to claim 3, further comprising finalizing the active object in the previous slice image based on an association parameter,
   wherein the association parameter is a ratio between a number of coordinates of the connected component in the current slice image, which match coordinates of the corresponding active object in the previous slice image, and a number of non-matching coordinates of the connected component in the current slice image.

11. The method according to claim 3, further comprising finalizing the active object in the previous slice image based on an association parameter,
   wherein the association parameter is an area of the connected component in the current slice image.

12. The method according to claim 3, further comprising:
   finalizing the active object in the previous slice image based on an association parameter; and
   removing the label of the corresponding active object in the previous slice image as an active object when the association parameter is greater than a predetermined value.

13. The method according to claim 12, further comprising removing the label of the connected component in the current slice image as an active object when the association parameter is greater than the predetermined value.

14. The method according to claim 3, further comprising finalizing the active object in the previous slice image based on an association parameter,
   wherein an active object is finalized when the association parameter is less than a predetermined value.

15. The method according to claim 3, further comprising:
   finalizing the active object in the previous slice image based on an association parameter; and
   labeling the connected component in the current slice image as the active object when the association parameter is greater than or equal to a first predetermined value and less than or equal to a second predetermined value.

16. The method according to claim 1, wherein a connected component in the current slice image is associated with the corresponding connected component in the previous slice image when coordinates of a pixel in the connected component in the current slice image matches coordinates of a pixel in the corresponding connected component in the previous slice image.

17. The method according to claim 1, wherein a connected component in the current slice image is associated with the corresponding connected component in the previous slice image when a difference between a center of mass of the connected component in the current slice image and a center of mass of the corresponding connected component in the previous slice image is less than a predetermined value.

18. The method according to claim 1, wherein a connected component in the current slice image is associated with a corresponding connected component in the previous slice image when a difference between an area of the connected component in the current slice image and an area of the corresponding connected component in the previous slice image is less than a predetermined value.

* * * * *